(12) United States Patent
Yoo

(10) Patent No.: US 10,276,147 B2
(45) Date of Patent: Apr. 30, 2019

(54) MICROPHONE SYSTEM AND METHOD FOR MANUFACTURING THE SAME

(71) Applicants: Hyundai Motor Company, Seoul (KR); Kia Motors Corporation, Seoul (KR)

(72) Inventor: Ilseon Yoo, Suwon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 65 days.

(21) Appl. No.: 15/610,852

(22) Filed: Jun. 1, 2017

(65) Prior Publication Data

US 2018/0122356 A1 May 3, 2018

(30) Foreign Application Priority Data

Nov. 3, 2016 (KR) .................. 10-2016-0146028

(51) Int. Cl.
*G10L 21/0208* (2013.01)
*G10L 21/0232* (2013.01)
*G10K 11/178* (2006.01)
*H04R 17/00* (2006.01)
*B60R 13/08* (2006.01)
(Continued)

(52) U.S. Cl.
CPC .......... *G10K 11/178* (2013.01); *B60R 13/08* (2013.01); *G10K 11/1787* (2018.01); *G10K 11/17823* (2018.01); *H04R 17/00* (2013.01); *B60J 1/02* (2013.01); *G10K 2210/129* (2013.01); *G10K 2210/12821* (2013.01); *G10K 2210/3044* (2013.01); *G10K 2210/3045* (2013.01); *G10K 2210/3211* (2013.01); *G10K 2210/3212* (2013.01); *G10K 2210/3218* (2013.01); *G10K 2210/3226* (2013.01); *G10K 2210/3229* (2013.01); *H04R 3/005* (2013.01); *H04R 19/005* (2013.01); *H04R 19/04* (2013.01); *H04R 31/003* (2013.01); *H04R 2201/003* (2013.01); *H04R 2410/05* (2013.01); *H04R 2499/13* (2013.01)

(58) Field of Classification Search
CPC .......... G10K 11/178; G10K 11/17823; G10K 2210/12821; B60J 1/02; G10L 21/0208; G10L 21/0232
USPC ............. 381/71.4, 94.1, 94.2, 94.3, 86, 122
See application file for complete search history.

(56) References Cited

U.S. PATENT DOCUMENTS 5,812,684 A * 9/1998 Mark ................... G10K 11/178
381/86
2013/0208923 A1* 8/2013 Suvanto ................ H04R 3/005
381/122

FOREIGN PATENT DOCUMENTS

JP 4857907 B2 1/2012
KR 20-1999-0021294 U 6/1999
(Continued)

*Primary Examiner* — Paul Kim
*Assistant Examiner* — Ubachukwu A Odunukwe
(74) *Attorney, Agent, or Firm* — Morgan, Lewis & Bockius LLP

(57) ABSTRACT

A microphone system may include a measuring device that includes a plurality of sound elements and a semiconductor chip connected to the sound elements and receives a vibration signal and a noise signal from the outside to cancel the vibration signal and changes a phase of the noise signal to output a reverse phase noise signal; and a driver that is connected to the semiconductor chip and is included in a front glass of a vehicle and vibrates in response to the reverse phase noise signal to cancel a noise signal inputted from the outside.

11 Claims, 9 Drawing Sheets

(51) Int. Cl.
*B60J 1/02* (2006.01)
*H04R 19/00* (2006.01)
*H04R 19/04* (2006.01)
*H04R 31/00* (2006.01)
*H04R 3/00* (2006.01)

(56) References Cited

FOREIGN PATENT DOCUMENTS

| | | |
|---|---|---|
| KR | 10-0768523 B1 | 10/2007 |
| KR | 10-2013-0047763 A | 5/2013 |
| KR | 10-2016-0009731 A | 1/2016 |

\* cited by examiner

MICROPHONE SYSTEM AND METHOD FOR MANUFACTURING THE SAME

CROSS-REFERENCE TO RELATED APPLICATION

The present application claims priority to Korean Patent Application No. Korean Patent Application No. 10-2016-0146028 filed on Nov. 3, 2016, the entire contents of which are incorporated herein for all purposes by this reference.

BACKGROUND OF THE INVENTION

Field of the Invention

The present invention relates to a microphone system and a method for manufacturing the same.

Description of Related Art

Recently, a microphone, which converts sound into an electrical signal, has been downsized. Downsized microphones are being developed based on microelectromechanical systems (MEMS) technology.

MEMS microphones have stronger humidity and heat resistances compared to a conventional electret condenser microphone (ECM), and may be downsized and integrated with a signal processing circuit.

The MEMS microphone is applied to various communication devices including mobile communication devices such as a smart phone, an earphone, a hearing aid, etc. MEMS microphones may be classified into capacitive type or piezoelectric type microphones.

A capacitive MEMS microphone includes a fixed membrane and a diaphragm. When sound pressure is applied externally the gap between the fixed membrane and diaphragm is deformed by the vibration of the diaphragm and the capacitance accordingly changes.

The sound pressure is measured on the basis of an electrical signal generated in the present process.

On the other hand, a piezoelectric MEMS microphone includes only a vibrating membrane. The vibrating membrane is deformed by an external sound and an electrical signal is generated by the piezoelectric effect, thereby measuring sound pressure.

Most MEMS microphones currently use a capacitive MEMS microphone. MEMS microphones recently used only for communication devices have been configured to measure a noise in a place where noise is often generated (e.g., inside a vehicle).

The noise transmitted through the windshield of a vehicle generates approximately 51% of the noise introduced into the vehicle.

Conventionally, a noise preventing material is used to prevent noise from being introduced into the vehicle. However, as aging occurs the vehicle generators more noise and the efficiency of the noise prevention material diminishes.

Therefore, research and development are needed to reduce the noise inside a vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a microphone system and a method for manufacturing the same which is configured for uniformly removing a noise over an entire frequency band transmitted via the front glass (or a windshield) of a vehicle, and configured to have a high noise cancellation rate.

An exemplary embodiment of the present invention is directed to provide the above microphone system, including a measuring device that is disposed with a plurality of sound elements and a semiconductor chip connected to the sound elements. The measuring device receives a vibration signal and a noise signal from the outside environment and is configured to cancel the vibration signal and change the phase of the noise signal to output a reverse phase noise signal. The system includes a driver that is connected to the semiconductor chip and disposed in the front glass of a vehicle configured to vibrate in response to the reverse phase noise signal to cancel the noise signal inputted from the outside environment.

The measuring device may include a first sound element formed at a position corresponding to the position of a sound inlet formed at one side of a case, and receives the vibration signal and the noise signal to output a first output signal; a second sound element formed at a position adjacent to the first sound element in a state of being shielded within the case and includes an air passage formed at one side of a lower portion thereof and receives only the vibration signal to output a second output signal; and a semiconductor chip connected to the first sound element and the second sound element configured to receive the first output signal and the second output signal to cancel the vibration signal and change the phase of the noise signal to output the reverse phase noise signal.

The driver may be electrically connected to the semiconductor chip and may be interposed between the internal front glass and the external front glass of a vehicle, and may include a piezoelectric actuator operated by the reverse phase noise signal.

The driver may include a piezoelectric film, electrode layers bonded to both surfaces of the piezoelectric film and electrically connected to the semiconductor chip, and flexible layers bonded to the external surfaces of the electrode layers and bonded to internal surfaces of the internal and external front glass.

Each of the flexible layers may include a transparent and flexible polymer material.

Each of the electrode layers may include a graphene material.

The semiconductor chip may be electrically connected to the sound elements via a plurality of current carrying parts.

An exemplary embodiment of the present invention is directed to provide a method for manufacturing the microphone system, including forming a measuring device containing a first and second sound element and a semiconductor chip inside a case including a sound inlet; and forming a driver that is connected to the semiconductor chip and is disposed in the front glass of a vehicle.

Forming the measuring device may include producing the first sound element at a position corresponding to the position of the sound inlet; and producing the second sound element at a position adjacent to the first sound element in a state of being shielded within the case and includes an air passage formed at one side of a lower portion of the second sound element.

Forming the measuring device may include creating a plurality of current carrying parts within the semiconductor chip so that the current carrying parts are connected to the first sound element and the second sound element.

Forming the driver may include: forming a first electrode layer on one surface of a first copper foil; coating a first flexible layer on an upper portion of the first electrode layer; etching the first copper foil; forming a second electrode layer on one surface of a second copper foil; coating a piezoelectric film on one surface of the second electrode layer; bonding the piezoelectric film to the first electrode layer; etching the second copper foil; and coating a second flexible layer on the other surface of the second electrode layer.

The first flexible layer and the second flexible layer may include a transparent and flexible polymer material.

The first electrode layer and the second electrode layer may include a graphene material.

An exemplary embodiment of the present invention may include the driver configured to vibrate according to the reverse phase noise signal transmitted from the measuring device, including the plurality of sound elements and the semiconductor chip, and is disposed in a large area of the front glass of a vehicle. The driver may uniformly remove the noise of an entire frequency band introduced into the front glass of the vehicle so that the exemplary embodiment of the present invention has a high noise cancellation rate.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
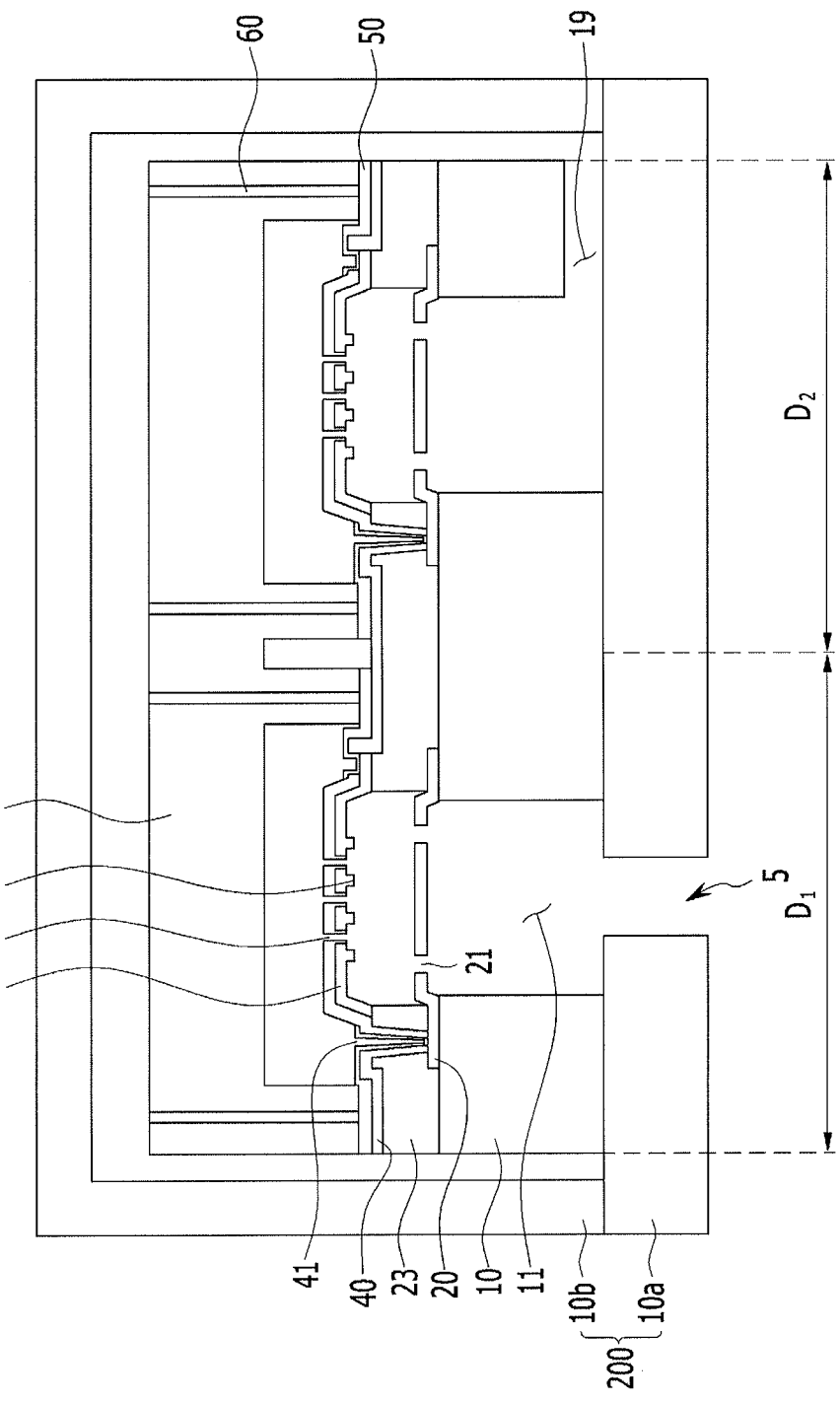
FIG. 1 is a schematic configuration diagram of a measuring device of a microphone system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimension, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
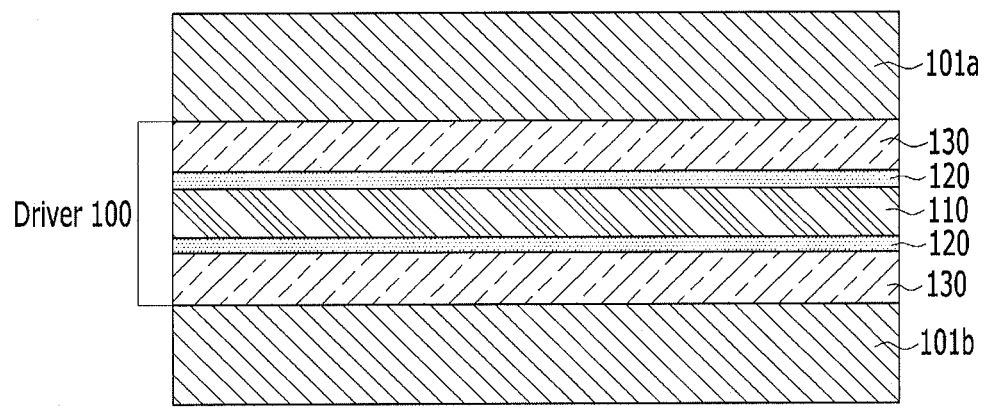
FIG. 2 is a schematic configuration diagram of a driver of the microphone system according to an exemplary embodiment of the present invention.

FIG. 1 is a schematic configuration diagram of the measuring device of a microphone system according to an exemplary embodiment of the present invention. FIG. 2 is a schematic configuration diagram of the driver of a microphone system according to an exemplary embodiment of the present invention.

The microphone system may include the measuring device (or a detector) 1 and the driver 100.

Referring to FIG. 1, the measuring device 1 may be formed using a microelectromechanical system (MEMS) technology.

The measuring device 1 may include a first sound element $D_1$, a second sound element $D_2$, and a semiconductor chip C.

The first sound element $D_1$ may be formed at a position corresponding to the position of sound inlet 5 formed at one side of a lower portion of a case 200.

The case 200 includes a lower case 10a and an upper case 10b.

The lower case 10a includes the sound inlet 5 through which a sound signal passes and may vibrate by a vibration signal.

The upper case 10b may be mounted on an upper portion of lower case 10a and may have a predetermined accommodation compartment for accommodating the first sound element $D_1$, second sound element $D_2$, and semiconductor chip C.

The case 200 may include a metal material.

The case 200 may have a cylindrical shape or a rectangular tube shape.

The first sound element $D_1$ may be formed at a position corresponding to the sound inlet 5 inside the case 200.

The first sound element $D_1$ may receive a vibration signal and a noise signal externally and may output a first output signal.

The vibration signal may be a signal generated by the vibration of the vehicle body, and the noise signal may be defined as a signal generated by an engine or the wind noise of the vehicle.

The second sound element $D_2$ may be formed at a position adjacent to the first sound element $D_1$ inside the case 200.

The second sound element $D_2$ may be kept in a state of being shielded within case 200, and may be configured to be independent of an external noise signal.

The second sound element $D_2$ may include an air passage (or an air path) 19 formed at one side of a lower portion of the second sound element.

The air passage 19 is configured as a passage through which only air flows. Air passage 19 is a compartment formed between the lower case 10a and the second sound element $D_2$, and may cause the mechanical vibration of the second sound element due to a vibration signal equal to the mechanical vibration of the first sound element $D_1$ due to the original vibration signal.

The second sound element $D_2$ may receive only a vibration signal from the lower case 10a and may output a second output signal.

The structure of the first sound element $D_1$ and the second sound element $D_2$ may be the same except for the air passage 19. The sound elements $D_1$ and $D_2$ may include a substrate 10, a diaphragm 20, and a fixed membrane 30 respectively.

The substrate 10 may include silicon and may include a sound hole 11.

The diaphragm 20 may be formed on an upper portion of the substrate 10 and may be exposed to sound hole 11.

A plurality of slots 21 may be formed in the diaphragm 20.

The fixed membrane 30 may be disposed at a predetermined distance from the diaphragm 20 and may include a plurality of air inlets 31.

In other words, diaphragm 20 and the fixed membrane 30 may be separated apart from each other by a predetermined distance, and an portion of the predetermined distance may form an air layer.

The air layer is configured to prevent diaphragm 20 and the fixed membrane 30 from coming in contact with each other.

When diaphragm 20 vibrates, so that the diaphragm 20 and the fixed membrane 30 come into contact with each other, the plurality of protrusions 33 formed on the lower portion of the fixed membrane are configured to minimize the contact area between the diaphragm 20 and fixed membrane 30.

A supporting layer 23 may be formed between the diaphragm 20 and the fixed membrane 30.

An insulation film 40 may be formed on the entire upper portions of fixed membrane 30 and the supporting layer 23.

Diaphragm 20 and the fixed membrane 30 are partially exposed so that electrode holes 41 may be respectively formed on both sides of insulation film 40. The diaphragm 20 and fixed membrane 30 may be electrically connected to the semiconductor chip C through electrode holes 41.

The semiconductor chip C may be formed on upper portions of the first sound element $D_1$ and the second sound element $D_2$, and may be electrically connected to the first sound element $D_1$ and the second sound element $D_2$.

The semiconductor chip C may be bonded to pads 50 formed on the upper portions of the first sound element $D_1$ and the second sound element $D_2$ by applying eutectic bonding to the pads.

The semiconductor chip C may be an application specific integrated circuit (ASIC).

Referring to FIG. 2, the driver 100 may be connected to semiconductor chip C of measuring device 1 and may be interposed between the internal front glass 101a and the external front glass 101b of a vehicle.

The driver 100 may be disposed in a large area of the entire front glass 101a and 101b.

The driver 100 may be a piezoelectric actuator and may include a piezoelectric film 110, an electrode layer 120, and a flexible layer 130.

The piezoelectric film 110 may include polyvinylidene fluoride (PVDF) which is a piezoelectric material.

The electrode layers 120 may be bonded to both surfaces of the piezoelectric film 110.

The electrode layers 120 may be electrically connected to the semiconductor chip C via an electrode line. The electrode layer 120 may include a graphene material.

The flexible layers 130 may be bonded to external surfaces of the electrode layers 120. The flexible layer 130 may be formed of a transparent and flexible polymer so that the driver 100 vibrates flexibly, for example the flexible layer 130 may include polydimethylsiloxane (PDMS).

Hereinafter, the signal processing method of a microphone system according to an exemplary embodiment of the present invention will be described with reference to FIG. 3.

Figure 3:
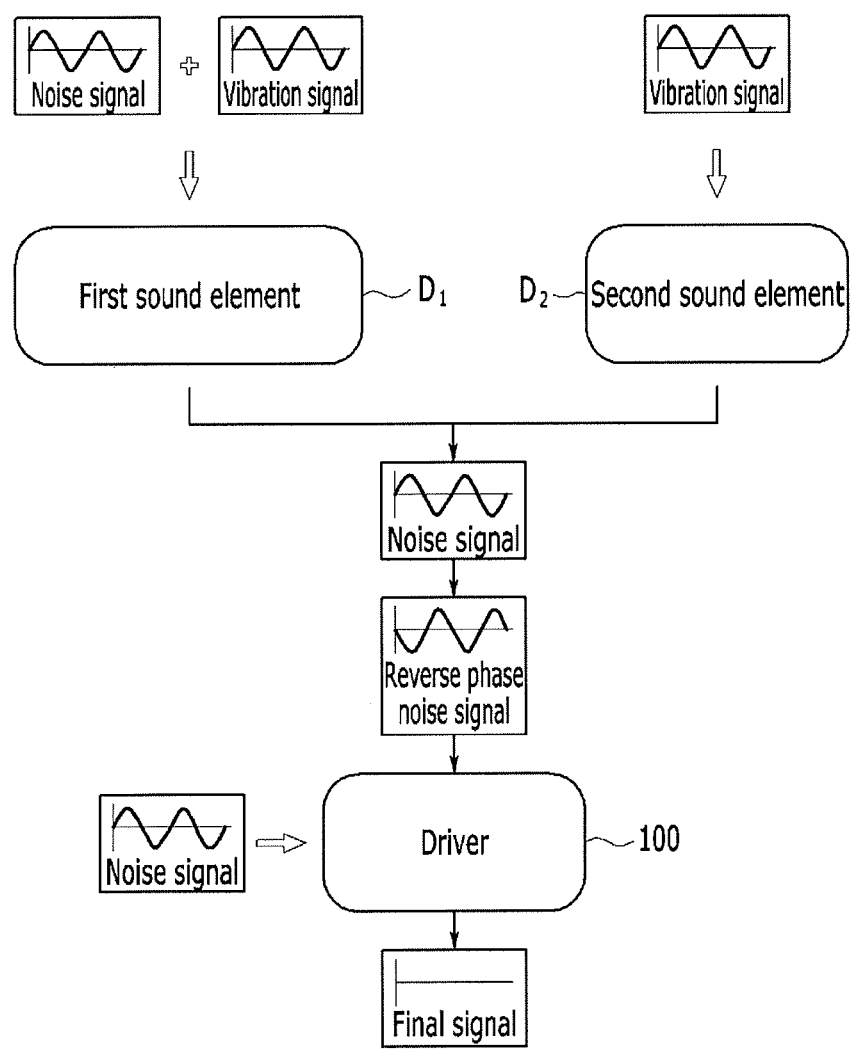
FIG. 3 is a configuration diagram illustrating a signal processing operation of the microphone system according to an exemplary embodiment of the present invention.

FIG. 3 is a configuration diagram illustrating the signal processing operations of the microphone system according to an exemplary embodiment of the present invention.

Referring to FIG. 3, the noise signal and the vibration signal may be input to measuring device 1 and driver 100.

The measuring device 1, including sound elements $D_1$ and $D_2$, may receive the noise signal and the vibration signal simultaneously, and the driver 100 may be configured to be independent of the vibration signal therefore only receiving the noise signal.

More specifically, the first sound element $D_1$ may receive the noise signal and the vibration signal from the outside and may output the first output signal.

The second sound element $D_2$ may receive the vibration signal and may output the second output signal.

The semiconductor chip C may receive the first output signal and the second output signal to cancel the vibration signal, and may change the phase of the noise signal to output a reverse phase noise signal.

The driver 100 may vibrate according to the reverse phase noise signal when the reverse phase noise signal is transmitted to the driver. The driver 100 may combine the reverse phase noise signal with the noise signal transmitting from the outside wherein the noise signal inputted from the outside is cancelled. Thus, the driver 100 may prevent the noise signal from entering the vehicle.

Hereinafter, a method of manufacturing the microphone system according to an exemplary embodiment of the present invention will be described with reference to FIG. 4, FIG. 5, FIG. 6, FIG. 7, FIG. 8, FIG. 9, FIG. 10, FIG. 11, FIG. 12, FIG. 13 and FIG. 14.

FIG. 4, FIG. 5, FIG. 6, FIG. 7, FIG. 8, FIG. 9, FIG. 10, FIG. 11, FIG. 12, FIG. 13 and FIG. 14 are process diagrams sequentially illustrating the method of manufacturing the microphone system.

The first sound element $D_1$ and the second sound element $D_2$ are formed adjacent to each other at opposite sides of the single substrate 10.

Although the first sound element $D_1$ and the second sound element $D_2$ are formed adjacent to each other on the single substrate 10, the positions of the first sound element $D_1$ and the second sound element $D_2$ may be altered as necessary, and the first sound element $D_1$ and the second sound element $D_2$ may be respectively formed using two substrates.

Figure 4:
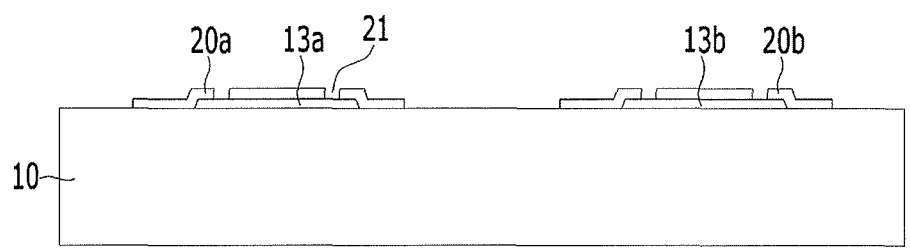
FIG. 4, FIG. 5, FIG. 6, FIG. 7, FIG. 8, FIG. 9, FIG. 10, FIG. 11, FIG. 12, FIG. 13 and FIG. 14 are process diagrams sequentially illustrating the method of manufacturing the microphone system according to an exemplary embodiment of the present invention.

Referring to FIG. 4, an oxide film may be formed on the substrate 10 and the formed oxide film may be patterned so that a first oxide layer 13a and a second oxide layer 13b may be formed.

Next, a first diaphragm 20a and a second diaphragm 20b may be formed on the first oxide layer 13a and the second oxide layer 13b respectively.

The first diaphragm 20a and the second diaphragm 20b may include slots 21 respectively.

Figure 5:
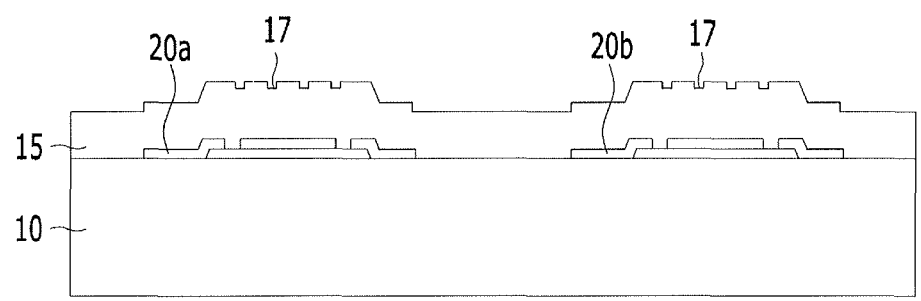

Referring to FIG. 5, a sacrificial layer 15 may be formed on substrate 10, the first diaphragm 20a, and the second diaphragm 20b.

The sacrificial layer 15 may force the fixed membrane 30 to be separated apart from the diaphragm by a predetermined distance.

Next, a plurality of depressions 17 may be formed at an upper portion of sacrificial layer 15 corresponding to the first diaphragm 20a and the second diaphragm 20b respectively.

Figure 6:
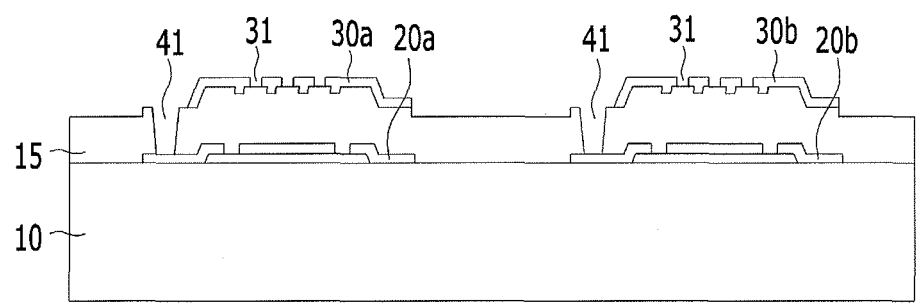

Referring to FIG. 6, a first fixed membrane 30a and a second fixed membrane 30b may be formed on the upper portion of the sacrificial layer 15 corresponding to the first diaphragm 20a and the second diaphragm 20b respectively.

The first fixed membrane 30a and the second fixed membrane 30b may include protrusions 33 corresponding to depressions 17.

When the diaphragm 20 vibrates wherein the diaphragm and the fixed membrane 30 come in contact with each other, the protrusions 33 may minimize the contact area between the diaphragm and the fixed membrane.

The air inlets 31 may be formed in the first fixed membrane 30a and the second fixed membrane 30b.

Next, portions of the surfaces of first diaphragm 20a and second diaphragm 20b may be exposed wherein the electrode holes 41 are formed at the portions of sacrificial layer 15.

The electrode holes 41 may be configured for exposing portions of the first diaphragm 20a and second diaphragm 20b to apply electric currents to the first diaphragm and second diaphragm.

Figure 7:
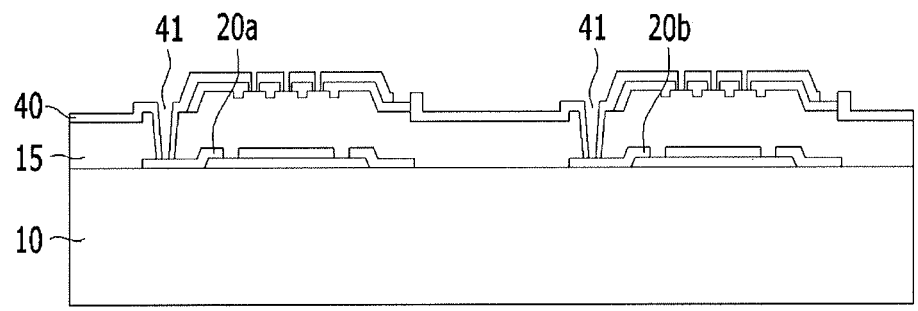

Referring to FIG. 7, the insulation film 40 may be formed entirely on sacrificial layer 15, first fixed membrane 30a, and second fixed membrane 30b.

Next, the insulation film 40 corresponding to portions of air inlets 31 may be etched.

Next, the insulation film 40 corresponding to each of the electrode holes 41 may be etched so portions of the first diaphragm 20a and the second diaphragm 20b are exposed.

Portions of insulation film 40 corresponding to the first fixed membrane 30a and second fixed membrane 30b may be etched so electrode holes 41 exposing the first fixed membrane and second fixed membrane may be formed.

Figure 8:
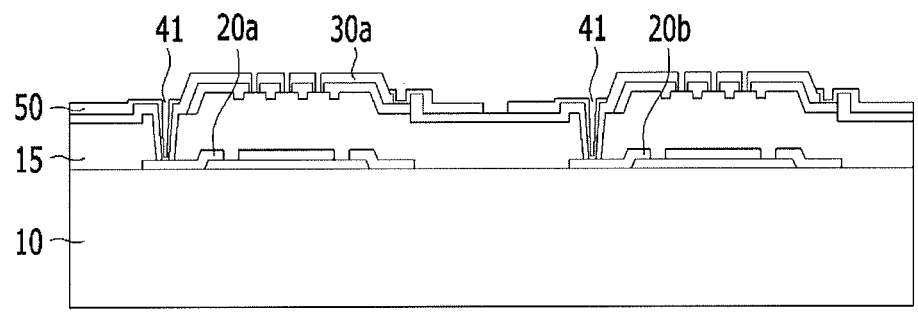

Referring to FIG. 8, a pad 50 may be formed on a portion of an upper surface of insulation film 40.

Pad 50 may include a metal material for bonding the semiconductor chip C.

Figure 9:
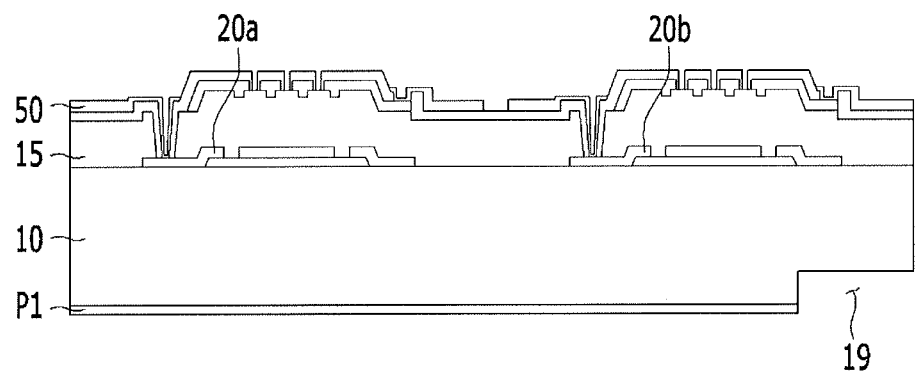

Referring to FIG. 9, after a first photoresist film P1 is formed on a lower portion of the substrate 10, the first photoresist film may be used as a mask so that the air passage 19 is formed at one side of a lower portion of substrate 10.

Figure 10:
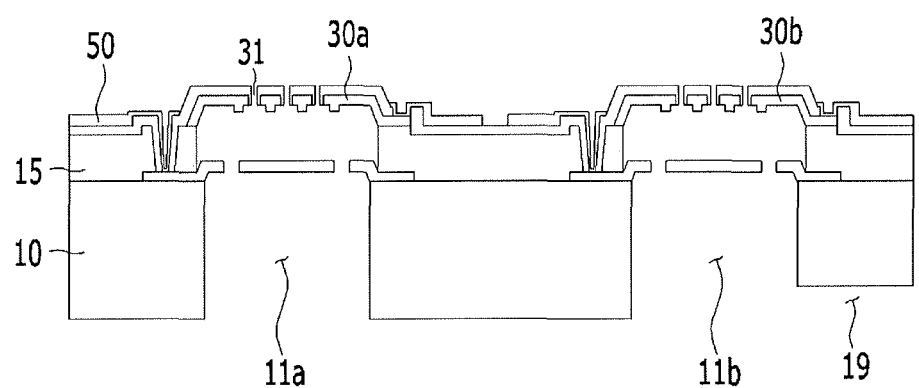

Referring to FIG. 10, after the first photoresist film P1 is removed and a second photoresist film is formed, a first sound hole 11a and a second sound hole 11b may be respectively formed in substrate 10 corresponding to the first diaphragm 20a and the second diaphragm 20b using the second photoresist film as a mask.

Next, the second photoresist film may be removed.

Next, after the first oxide layer 13a and the second oxide layer 13b are removed, the sacrificial layer 15 may be removed so supporting layer 23 is formed.

Figure 11:
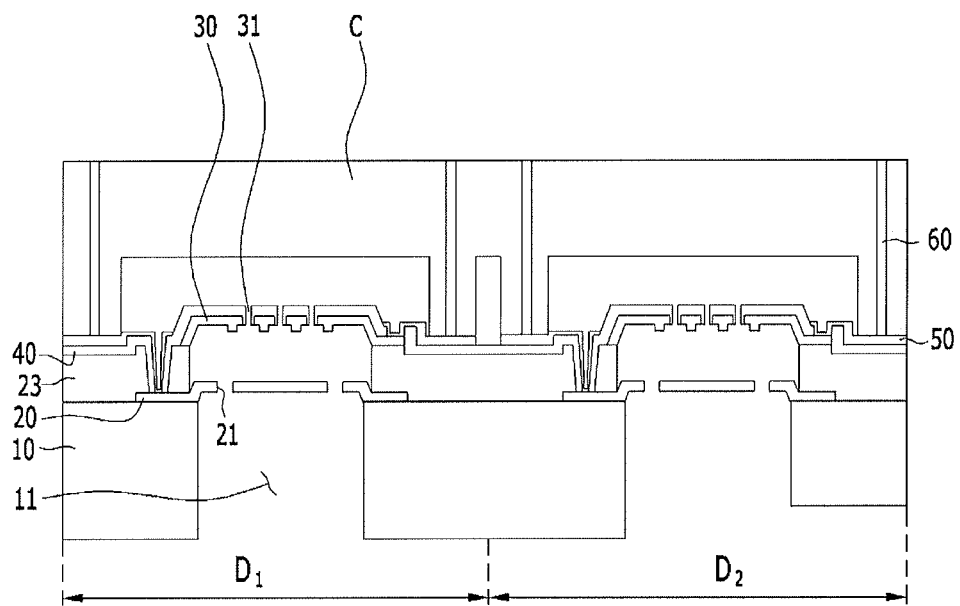

Referring to FIG. 11, the semiconductor chip C, including a plurality of current carrying parts 60, may be bonded to pads 50 formed on the upper portions of the first sound element $D_1$ and the second sound element $D_2$ by applying eutectic bonding to the pads. The current carrying parts 60 may be formed in a vertical direction thereof.

In the measuring device 1 manufactured by the above manufacturing method the first sound element $D_1$ may include the first diaphragm 20a, first sound hole 11a, and first fixed membrane 30a, and the second sound element $D_2$ may include the second diaphragm 20b, second sound hole 11b, and second fixed membrane 30b.

The measuring device 1 may be manufactured as a single chip by a semiconductor batch process using a microelectromechanical systems (MEMS) technology. The first sound element $D_1$ and the second sound element $D_2$ of the measuring device may be formed adjacent to each other using the single substrate, and the vibration signal and the noise signal may be processed by the semiconductor chip C of the measuring device.

Figure 12:
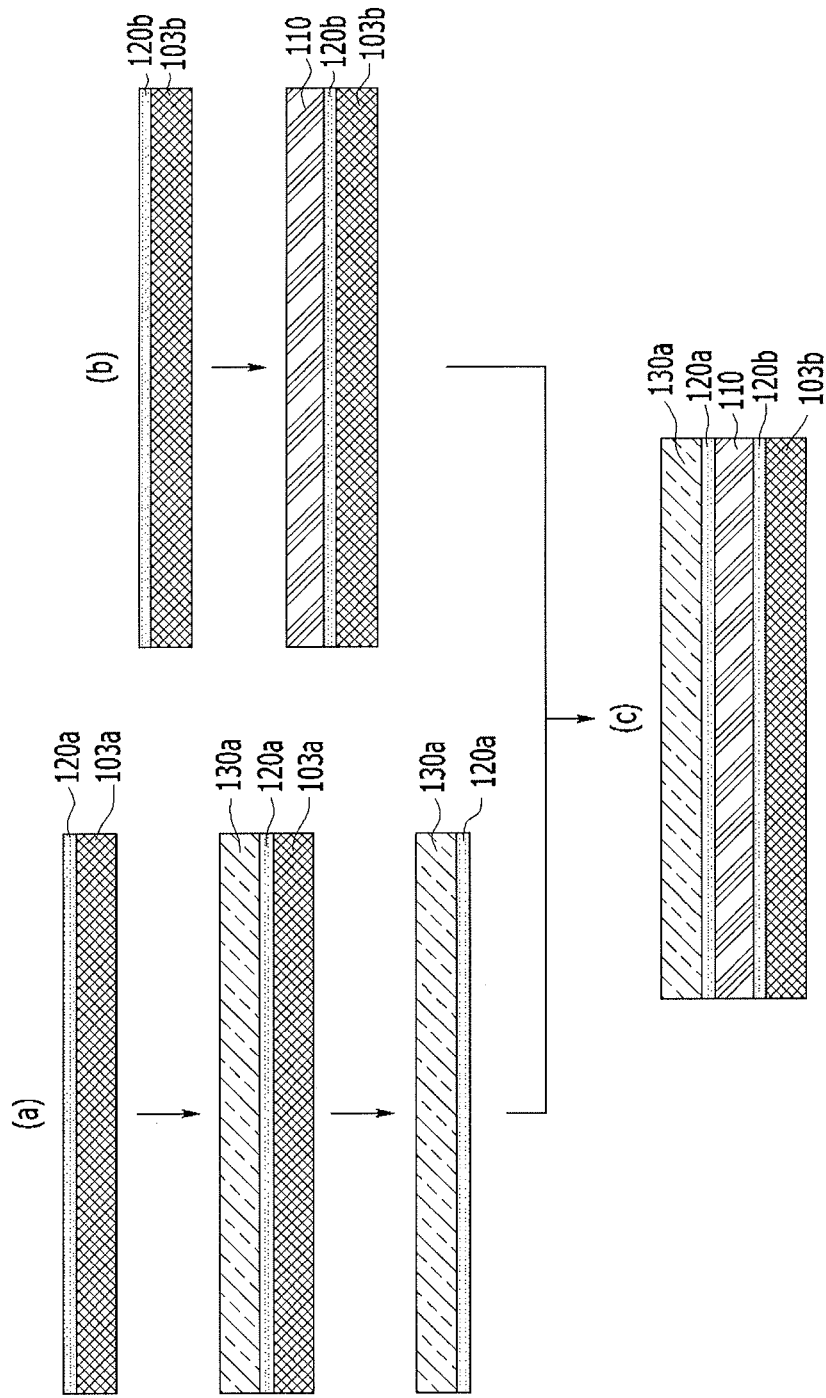

Referring to FIG. 12, a first electrode layer 120a of driver 100 may be formed on one surface of a first copper foil 103a. The first electrode layer 120a may include a graphene material.

Next, a first flexible layer 130a may be coated on an upper portion of the first electrode layer 120a. The first flexible layer 130a may include a transparent and flexible polymer material, For example, the first flexible layer 130a may include polydimethylsiloxane (PDMS).

Next, the first copper foil 103a may be removed by an etching process.

Referring to FIG. 12, a second electrode layer 120b of driver 100 may be formed on one surface of a second copper foil 103b. The second electrode layer 120b may include a graphene material.

Next, the piezoelectric film 110 may be coated on one surface of the second electrode layer 120b.

Referring to FIG. 12, the piezoelectric film 110 may be bonded to the first electrode layer 120a.

Figure 13:
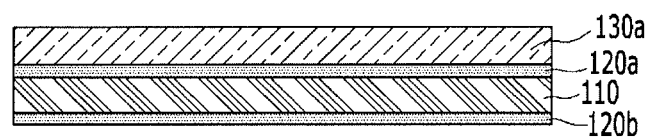

Referring to FIG. 13, the second copper foil 103b may be removed by an etching process.

Figure 14:
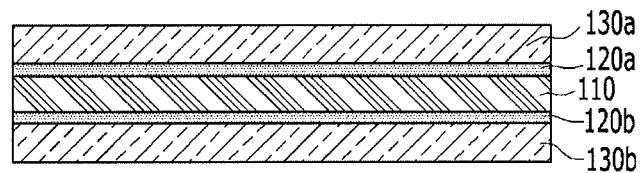

Referring to FIG. 14, a second flexible layer 130b may be coated on the other surface of the second electrode layer 120b.

The second flexible layer 130b may include a transparent and flexible polymer material, For example, the second flexible layer 130b may include polydimethylsiloxane (PDMS).

The microphone system and a method of manufacturing the same according to an exemplary embodiment of the present invention may include a driver 100 that vibrates according to the reverse phase noise signal transmitted from measuring device 1 including the sound elements $D_1$ and $D_2$ and the semiconductor chip C, and is disposed in a large area of the front glass 101a and 101b of the vehicle. Thus, the driver 100 may remove the noise of an entire frequency band introduced into the front glass of a vehicle so that an exemplary embodiment of the present invention has a high noise cancellation rate.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards" and "backwards" are used to describe features of the exemplary embodiments with reference to the positions of such features as displayed in the figures.

The foregoing description of specific exemplary embodiments of the present invention have been presented for purposes of illustrative and description. They are not intended to be exhaustive or to limit the invention to those precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A microphone system, comprising:
   a measuring device that includes a plurality of sound elements and a semiconductor chip connected to the sound elements and receives a vibration signal and a noise signal from an outside thereof to cancel the vibration signal and changes a phase of the noise signal to output a reverse phase noise signal; and
   a driver that is connected to the semiconductor chip and is included in a front glass of a vehicle and vibrates in response to the reverse phase noise signal to cancel a noise signal inputted from an outside thereof, wherein the driver comprises:
   a piezoelectric film;
   electrode layers that are bonded to a first surface and a second surface of the piezoelectric film and are electrically connected to the semiconductor chip; and
   flexible layers that are bonded to external surfaces of the electrode layers and are bonded internal surfaces of an internal front glass and an external front glass.

2. The microphone system of claim 1, wherein the measuring device comprises:
   a first sound element that is formed at a position corresponding to a position of a sound inlet formed at a first side of a case and receives the vibration signal and the noise signal to output a first output signal;
   a second sound element that is formed at a position adjacent to the first sound element in a state of being shielded in the case and includes an air passage formed at a first side of a lower portion thereof and receives the vibration signal to output a second output signal; and
   a semiconductor chip that is connected to the first sound element and the second sound element and receives the first output signal and the second output signal to cancel the vibration signal and changes the phase of the noise signal to output the reverse phase noise signal.

3. The microphone system of claim 1, wherein the driver is electrically connected to the semiconductor chip and is interposed between the internal front glass and the external front glass of the vehicle and includes a piezoelectric actuator operating by the reverse phase noise signal.

4. The microphone system of claim 1, wherein each of the flexible layers includes a transparent and flexible polymer material.

5. The microphone system of claim 1, wherein each of the electrode layers includes a graphene material.

6. The microphone system of claim 1, wherein the semiconductor chip is electrically connected to the sound elements via a plurality of current carrying parts.

7. A method for manufacturing a microphone system, the method comprising:
   forming a measuring device including a first sound element, a second sound element, and a semiconductor chip in a case including a sound inlet; and
   forming a driver that is connected to the semiconductor chip and is included in a front glass of a vehicle, wherein the forming the driver comprises:
   forming a first electrode layer on a first surface of a first copper foil;
   coating a first flexible layer on an upper portion of the first electrode layer;
   etching the first copper foil;
   forming a second electrode layer on a first surface of a second copper foil;
   coating a piezoelectric film on a first surface of the second electrode layer;
   bonding the piezoelectric film to the first electrode layer;
   etching the second copper foil; and
   coating a second flexible layer on a second surface of the second electrode layer.

8. The method of claim 7, wherein the forming the measuring device comprises:
   forming the first sound element at a position corresponding to a position of the sound inlet; and
   forming the second sound element that is formed at a position adjacent to the first sound element in a state of being shielded in the case and includes an air passage formed at a first side of a lower portion of the second sound element.

9. The method of claim 7, wherein the forming the measuring device comprises:
   forming a plurality of current carrying parts within the semiconductor chip wherein the current carrying parts are connected to the first sound element and the second sound element.

10. The method of claim 7, wherein each of the first flexible layer and the second flexible layer includes a transparent and flexible polymer material.

11. The method of claim 7, wherein each of the first electrode layer and the second electrode layer includes a graphene material.

* * * * *